INVENTOR.
RAYNARD C. MARSHALL

United States Patent Office 3,490,071
Patented Jan. 20, 1970

3,490,071
CHIN ACTUATED WELDING HELMET
Raynard C. Marshall, Runnells, Iowa 50237
Filed Oct. 30, 1967, Ser. No. 678,988
Int. Cl. A61f 9/06
U.S. Cl. 2—8
1 Claim

ABSTRACT OF THE DISCLOSURE

A helmet for a welder, the helmet including a window with a pivotable lens carried within the window, the lens comprising a darkened glass to prevent passage of harmful welding rays to pass, and the helmet including a leverage mechanism activated by movement of the welder's chin whereby the lens is pivoted outwardly so to allow the welder to look through the vacant window and see the progress of his work between welding operations without the necessity of using his hands to push the helmet aside to allow such viewing.

---

This invention relates generally to helmets for welders.

A principal object of the present invention is to provide a welding helmet which incorporates a leverage mechanism so to hinge out of the way a darkened lens from a window opening so as to allow the welder to inspect the progress of his work between actual welding operations. It is generally well known that a welder views the welding operation while in progress through a darkly coated glass or lens so as to prevent the harmful rays from the weld to reach his eyes. Periodically, however, with conventional welding helmets, he is obliged to raise the welding helmet so that he may view the progress of the work intermittently between welding operations so as to see whether the welding is taking place correctly. In order to raise the welding helmet, he is obliged to put down the welding tools from his hands so that he may use his hand for raising the helmet. This is of course time consuming and accordingly objectionable.

Accordingly it is another object of the present invention to provide a helmet for a welder which includes a leverage mechanism for hingedly pivoting upwardly the lens so to expose the vacant window through which the welder may look, the leverage mechanism being activated by the movement of the welder's chin, thereby not requiring the welder to use his hand to allow direct viewing, and thus allowing the hands to be continually occupied with the welding tools.

Yet a further object of the present invention is to provide a welder's helmet wherein the leverage mechanism is readily adjustable to accommodate welders of different size heads so that the chin may be in a position for properly operating the leverage mechanism.

Other objects of the present invention are to provide a helmet for a welder which is simple in design, inexpensive to manufacture, rugged in construction, easy to use and efficient in operation.

These and other objects will be readily evident upon a study of the following specification and accompanying drawing wherein.

Figure 1:
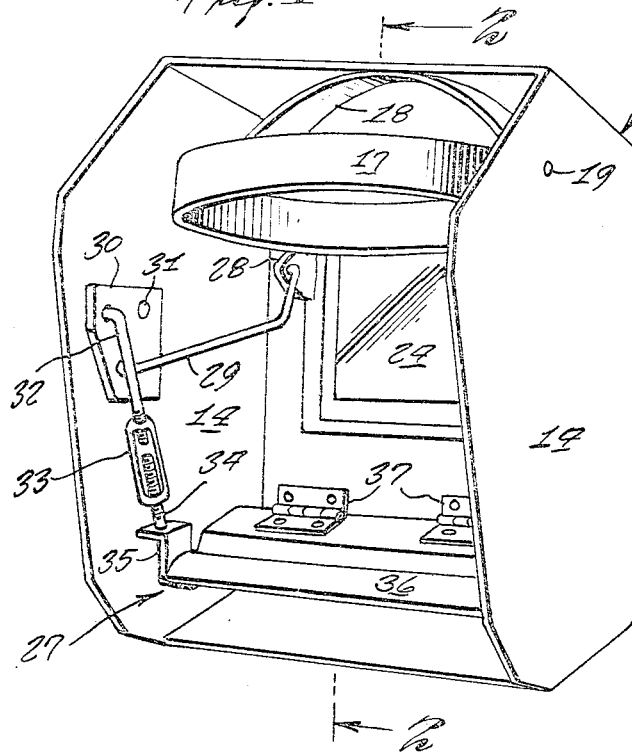
FIGURE 1 is a perspective view of the present invention viewed from the rear side.

Referring now to the drawing in detail, the reference numeral 10 represents a welder's helmet, according to the present invention, wherein there is a protective canopy or shield 11 that is fitted around the forward part of the head 12 of a welder, the shield including a front wall 13, opposite side walls 14 and a top wall 15 as well as a small bottom wall 16. A headband 17 is receivable around the welder's head, the head band 17 having an overhead strap 18 secured thereto. The headband is secured by means of a pin 19 to a side wall of the helmet so to allow the helmet to be supported upon the person's head.

Upon the front wall 13 of the helmet, there is frame 20 upon which there is carried a pair of hinges 21 having a hinge pin 22 for the purpose of supporting a lens frame 23 within which there is mounted a lens 24 which comprises a glass that is heavily darkened so as to prevent harmful light rays from a welding operation to penetrate therethrough. A coil spring 25 mounted upon the pin 22 between the hinges 21 normally urges the lens frame 23 to remain in a closed position to enclose a window opening 26 formed in the front wall 13 of the helmet.

A leverage mechanism 27 is provided for pivotally moving the lens frame out of the window opening 26. The leverage mechanism 27 includes a lug 28 upon the rear side of the lens frame 23, the lug 28 being connected pivotally free to the one end of a rod 29 which is connected pivotally free at its opposite end to a pivot plate 30 that is pivotable about a pin 31 secured within the side wall 14 of the helmet 11, the pivot plate 30 being connected pivotally free to one end of a second rod 32 connected at its opposite end to a turnbuckle 33. The turnbuckle at its opposite end is connected to a rod 34 which is secured to a bracket 35 which in turn is secured to the underside of a chin bar 36 which is fastened pivotally free by means of a pair of hinges 37 to the rear side of the front wall 12.

Figure 3:
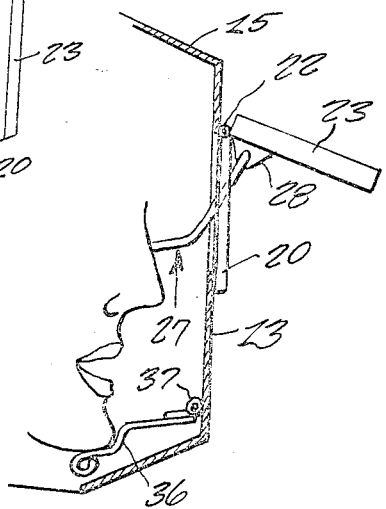
FIGURE 3 is a view similar to FIGURE 2 shown fragmentarily and showing the helmet lens in an alternate position.
Figure 2:
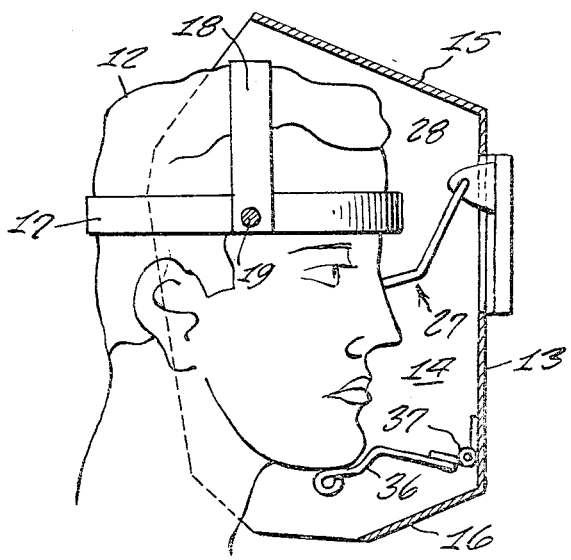
FIGURE 2 is a cross sectional view taken on the line 2—2 of FIGURE 1.
Figure 4:
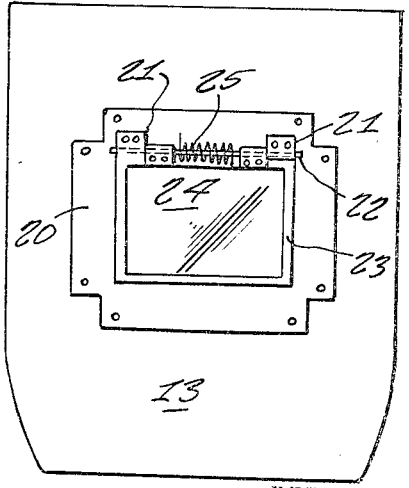
FIGURE 4 is a front elevation view of the helmet.

In operative use, the welder employs both hands to perform a welding operation. During this welding operation, the operator observes the work through the darkened lens 24 which is fitted over the window opening 26 of the helmet. From time to time, it is necessary to observe progress of the work. At such time, the welder ceases the welding operation so as to cease the creation of the bright light from the welding operation. He then merely moves downward his chin so to cause the chin-bar to be pivoted about the hinge 37 which in turn causes the rods 34 and 32 to pivot the pivot plate 30 which in turn pivots the connecting rod 29 in a forwardly direction so to cause the lens frame 23 to be pivoted outwardly of the window opening as is shown in FIGURE 3, so as to allow the operator to observe the work progress through the vacant window opening. In order to close the lens again, he merely closes his mouth from the position shown in FIGURE 3 to the position shown in FIGURE 2 whereby the chin is raised to cause the leverage mechanism to operate in reverse and close the lens again into the window opening. Thus he is able to selectively observe the work progress without the necessity of putting his working tools out of his hands.

I claim:

1. In a welder's helmet, the combination of a shield, a headband secured to a side wall of said helmet shield, said headband having an overhead band secured thereto for resting against the opposite side of a person's head, said shield including a front wall, opposite side walls, a top wall and a bottom wall, a window opening in said front wall and lens frame pivotally carried to close said window opening, a leverage mechanism providing means for pivotally moving said lens window frame out of said window opening, said leverage mechanism including a lug on the rear side of said lens frame, one end of a first rod securing pivotally free to said lug, the opposite end of said rod being secured pivotally free to a generally rectangular pivot plate, said pivot plate being pivotably carried in said side wall of said shield, a second rod secured pivotally free to said pivot plate and through a turnbuckle to a bracket mounted upon a chin bar that is hingedly connected by means of a pair of hinges to a rear side of said front wall, said rectangular pivot plate being pivotable about a pin near an upperforward corner thereof, the end of said first rod being attached pivotally free near a lower rear corner of said pivot plate, said second rod being secured pivotally free near an upper rear corner of said pivot plate, said lens frame carrying a coated lens, said lens frame being hingedly retained against said window opening by means of a coil spring.

References Cited
UNITED STATES PATENTS

| | | | |
|---|---|---|---|
| 1,777,454 | 10/1930 | Shirmer | 2—8 |
| 3,339,207 | 9/1967 | Perry | 2—8 |

JAMES R. BOLER, Primary Examiner